(12) United States Patent
Lichtenstein et al.

(10) Patent No.: US 12,273,357 B2
(45) Date of Patent: *Apr. 8, 2025

(54) SYSTEM AND METHOD FOR DETECTING LATERAL MOVEMENT USING SSH PRIVATE KEYS

(71) Applicant: Wiz, Inc., New York, NY (US)

(72) Inventors: Avi Tal Lichtenstein, Tel Aviv (IL); Ami Luttwak, Binyamina (IL); Yinon Costica, Tel Aviv (IL)

(73) Assignee: Wiz, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/888,947

(22) Filed: Sep. 18, 2024

(65) Prior Publication Data

US 2025/0016175 A1     Jan. 9, 2025

Related U.S. Application Data

(63) Continuation of application No. 18/887,706, filed on Sep. 17, 2024, which is a continuation of application No. 18/798,397, filed on Aug. 8, 2024, which is a continuation of application No. 18/588,981, filed on Feb. 27, 2024, now Pat. No. 12,095,777, which is a continuation of application No. 18/457,752, filed on Aug. 29, 2023, now Pat. No. 11,949,690, which is a continuation of application No. 17/657,495, filed on Mar. 31, 2022, now Pat. No. 11,799,874.

(60) Provisional application No. 63/170,123, filed on Apr. 2, 2021.

(51) Int. Cl.
*H04L 9/40* (2022.01)

(52) U.S. Cl.
CPC .................... *H04L 63/14* (2013.01)

(58) Field of Classification Search
None
See application file for complete search history.

(56) References Cited

U.S. PATENT DOCUMENTS

| | | | |
|---|---|---|---|
| 8,595,822 B2 | 11/2013 | Schrecker et al. | |
| 8,984,610 B2 * | 3/2015 | Spiers | H04L 63/0281 726/22 |
| 9,825,978 B2 | 11/2017 | Siva Kumar et al. | |
| 10,397,185 B1 | 8/2019 | Sandholm et al. | |
| 10,476,898 B2 | 11/2019 | Muddu et al. | |
| 10,691,480 B2 * | 6/2020 | Do | G06F 8/61 |
| 11,184,392 B2 | 11/2021 | Thomas et al. | |
| 11,258,590 B1 | 2/2022 | Tsarfati et al. | |
| 11,606,378 B1 * | 3/2023 | Delpont | H04L 43/16 |
| 11,799,874 B1 * | 10/2023 | Lichtenstein | H04L 63/14 |
| 11,811,786 B1 * | 11/2023 | Lichtenstein | H04L 63/0823 |
| 11,811,787 B1 * | 11/2023 | Lichtenstein | H04L 63/14 |

(Continued)

*Primary Examiner* — Kaveh Abrishamkar
(74) *Attorney, Agent, or Firm* — M&B IP Analysts, LLC

(57) ABSTRACT

A system and method for detecting lateral movement based on an exposed cryptographic network protocol (CNP) key in a cloud computing environment. The method includes: inspecting a first workload for a private CNP key, the private CNP key associated with a hash of a public CNP key; detecting in a security database a representation of the public CNP key; generating a lateral movement path, the lateral movement path including an identifier of a second workload, the second workload represented by a representation connected to the representation of the public CNP key.

25 Claims, 6 Drawing Sheets

(56) References Cited

U.S. PATENT DOCUMENTS

| | | | |
|---|---|---|---|
| 11,916,926 B1* | 2/2024 | Lichtenstein | H04L 63/14 |
| 12,095,776 B2* | 9/2024 | Lichtenstein | H04L 63/0823 |
| 2002/0161996 A1* | 10/2002 | Koved | G06F 21/52 |
| | | | 713/150 |
| 2014/0059541 A1 | 2/2014 | Heninger et al. | |
| 2014/0075013 A1 | 3/2014 | Agrawal et al. | |
| 2014/0089658 A1 | 3/2014 | Raghuram et al. | |
| 2015/0121078 A1 | 4/2015 | Fu et al. | |
| 2016/0127353 A1* | 5/2016 | Thomas | H04L 9/006 |
| | | | 713/156 |
| 2017/0026355 A1* | 1/2017 | Mathaiyan | H04L 63/0428 |
| 2018/0367548 A1* | 12/2018 | Stokes, III | H04L 63/1416 |
| 2019/0297112 A1* | 9/2019 | Yu | H04L 63/18 |
| 2020/0177617 A1* | 6/2020 | Hadar | G06F 16/9024 |
| 2020/0177619 A1* | 6/2020 | Hadar | H04L 41/142 |
| 2020/0267552 A1 | 8/2020 | Lee et al. | |
| 2020/0356664 A1* | 11/2020 | Maor | G06F 21/552 |
| 2021/0051137 A1* | 2/2021 | Ruiz | H04L 9/0894 |
| 2021/0120026 A1* | 4/2021 | Kondaveeti | H04L 63/0272 |
| 2021/0203684 A1* | 7/2021 | Maor | G06F 16/2379 |
| 2022/0060509 A1* | 2/2022 | Crabtree | H04L 63/1433 |
| 2022/0345483 A1* | 10/2022 | Shua | H04L 9/0825 |
| 2023/0011957 A1 | 1/2023 | Panse et al. | |
| 2023/0164164 A1* | 5/2023 | Herzberg | H04L 63/20 |
| | | | 726/1 |
| 2023/0421573 A1* | 12/2023 | Lichtenstein | H04L 63/14 |

* cited by examiner

SYSTEM AND METHOD FOR DETECTING LATERAL MOVEMENT USING SSH PRIVATE KEYS

CROSS-REFERENCE TO RELATED APPLICATIONS

This application is a continuation of U.S. patent application Ser. No. 18/887,706, filed Sep. 17, 2024, which itself is a continuation of U.S. patent application Ser. No. 18/798,397, filed Aug. 8, 2024, which itself is a continuation of U.S. patent application Ser. No. 18/588,981, filed Feb. 27, 2024, which itself is a continuation of U.S. patent application Ser. No. 18/457,752 filed Aug. 29, 2023, which itself is a continuation of U.S. Pat. No. 11,799,874, filed Mar. 31, 2022, which claims the benefit of U.S. Provisional Application No. 63/170,123 filed on Apr. 2, 2021, all contents of which are hereby incorporated by reference.

TECHNICAL FIELD

The present disclosure relates generally to cybersecurity, and in particular to techniques for detecting lateral movement in cloud computing environments.

BACKGROUND

As users migrate data storage, processing, and management tasks to decentralized, off-location devices, platforms, and services, the limitations of such devices, platforms, and services, also referred to as cloud environments, platforms, and the like, may impact a user's data operations. Specifically, vulnerabilities within cloud-deployed resources and processes may present unique challenges requiring remediation. Due to the scale and structure of cloud systems, detection of workload vulnerabilities, which detection may be readily-provided in non-cloud deployments, may require numerous complex tools and operations.

Current solutions to cloud workload vulnerability scanning challenges require the deployment of specialized tools, including scanning agents directed to maintenance of virtual machines (VMs), where operation and maintenance of such tools may be costly, time-consuming, or both. Agent-dependent processes are more complex to deploy and maintain for scanning of containers, such as containers managed using Kubernetes®, and others, like, container-management platforms, and may fail to provide for coverage of serverless applications. Where such agent-implementation processes fail to provide for full cloud workload vulnerability scanning, additional methods, such as snapshot-based scanning, may supplement implemented solutions.

Cloud environments are susceptible to attacks such as lateral movement, in which an attacker attempts to gain access to a resource within the cloud environment, and move through that resource to a next resource in the network. For example, an attacker may gain access through an endpoint of a cloud environment, using a malware attack, then gain access to user credentials which allow the attacker to access the cloud environment, and possibly employ privilege escalation and other attacks. Once initiated, lateral movement is difficult to detect, and the more credentials an attacker is able to discover and possess, the more opportunities the attacker has to infiltrate the cloud environment and achieve their goals.

Detection of lateral movement is therefore desirable, as is prevention of such attacks. It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In one general aspect, method may include inspecting a first workload for a private CNP key, the private CNP key associated with a hash of a public CNP key. Method may also include detecting in a security database a representation of the public CNP key. Method may furthermore include generating a lateral movement path, the lateral movement path including an identifier of a second workload, the second workload represented by a representation connected to the representation of the public CNP key. Other embodiments of this aspect include corresponding computer systems, apparatus, and computer programs recorded on one or more computer storage devices, each configured to perform the actions of the methods.

Implementations may include one or more of the following features. Method where the workload is deployed in a cloud computing environment, and the security database includes a representation of the cloud computing environment. Method may include: determining that the public CNP key hash of the private CNP key matches a public key hash represented in the security database by a public CNP key node. Method may include: connecting in the security database the representation of the private CNP key to the representation of the public CNP key in response to determining that the public CNP key hash of the private CNP key matches the public CNP key hash. Method may include: detecting that the private CNP key is stored as any one of: cleartext, and plaintext. Method where the workload is any one of: a virtual machine, and a software container. Method where the workload is a secure shell (SSH) server deployed in a cloud computing environment. Method where the private CNP key is stored in any one of: a PKCS format, and an OpenSSH format. Method may include: detecting a user account identifier in the private CNP key; generating a user representation representing the user account in the security database; and connecting the user representation to the representation of the private CNP key. Method may include: detecting in the security database a representation of a second workload connected to the representation of the private CNP key, where the representation of the second workload corresponds to a second workload which is an exposed workload. Method where the second workload is exposed to a network external to the cloud computing environment. Method where the private CNP key is stored in the second workload in any one of: plaintext, and cleartext. Method may include: determining that the private CNP key is exposed. Method where the CNP is Secure Shell (SSH) protocol. Implementations of the described techniques may include hardware, a method or process, or a computer tangible medium.

In one general aspect, non-transitory computer-readable medium may include one or more instructions that, when executed by one or more processors of a device, cause the device to: inspect a first workload for a private CNP key, the private CNP key associated with a hash of a public CNP key. Medium may furthermore detect in a security database a representation of the public CNP key. Medium may in addition generate a lateral movement path, the lateral movement path including an identifier of a second workload, the second workload represented by a representation connected to the representation of the public CNP key. Other embodiments of this aspect include corresponding computer systems, apparatus, and computer programs recorded on one or more computer storage devices, each configured to perform the actions of the methods.

In one general aspect, system may include a processing circuitry. System may also include a memory, the memory containing instructions that, when executed by the processing circuitry, configure the system to: inspect a first workload for a private CNP key, the private CNP key associated with a hash of a public CNP key. System may in addition detect in a security database a representation of the public CNP key. System may moreover generate a lateral movement path, the lateral movement path including an identifier of a second workload, the second workload represented by a representation connected to the representation of the public CNP key. Other embodiments of this aspect include corresponding computer systems, apparatus, and computer programs recorded on one or more computer storage devices, each configured to perform the actions of the methods.

Implementations may include one or more of the following features. System where the workload is deployed in a cloud computing environment, and the security database includes a representation of the cloud computing environment. System where the memory contains further instructions which when executed by the processing circuitry further configure the system to: determine that the public CNP key hash of the private CNP key matches a public key hash represented in the security database by a public CNP key node. System where the memory contains further instructions which when executed by the processing circuitry further configure the system to: connect in the security database the representation of the private CNP key to the representation of the public CNP key in response to determining that the public CNP key hash of the private CNP key matches the public CNP key hash. System where the memory contains further instructions which when executed by the processing circuitry further configure the system to: detect that the private CNP key is stored as any one of: cleartext, and plaintext. System where the workload is any one of: a virtual machine, and a software container. System where the workload is a secure shell (SSH) server deployed in a cloud computing environment. System where the private CNP key is stored in any one of: a PKCS format, and an OpenSSH format. System where the memory contains further instructions which when executed by the processing circuitry further configure the system to: detect a user account identifier in the private CNP key; generate a user representation representing the user account in the security database; and connect the user representation to the representation of the private CNP key. System where the memory contains further instructions which when executed by the processing circuitry further configure the system to: detect in the security database a representation of a second workload connected to the representation of the private CNP key, where the representation of the second workload corresponds to a second workload which is an exposed workload. System where the second workload is exposed to a network external to the cloud computing environment. System where the private CNP key is stored in the second workload in any one of: plaintext, and cleartext. System where the memory contains further instructions which when executed by the processing circuitry further configure the system to: determine that the private CNP key is exposed. System where the CNP is Secure Shell (SSH) protocol. Implementations of the described techniques may include hardware, a method or process, or a computer tangible medium.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In one general aspect, method may include inspecting a first workload for a private CNP key, the private CNP key associated with a hash of a public CNP key. Method may also include detecting in a security database a representation of the public CNP key. Method may furthermore include detecting in the security database a representation of a second workload connected to the representation of a second private CNP key. Method may in addition include generating a lateral movement path, the lateral movement path including an identifier of the second workload, in response to detecting that the representation of the second private CNP key is connected to the representation of the public CNP key. Other embodiments of this aspect include corresponding computer systems, apparatus, and computer programs recorded on one or more computer storage devices, each configured to perform the actions of the methods.

Implementations may include one or more of the following features. Method may include: determining that the hash of the public CNP key associated with the private CNP key matches a public key hash represented in the security database by a public CNP key node. Method may include: determining that the hash of the public CNP key associated with the private CNP key matches the public CNP key hash. Method may include: connecting in the security database the representation of the private CNP key to the representation of the public CNP key in response to determining that hash of the public CNP key associated with the private CNP key matches the public CNP key hash. Method may include: detecting that the private CNP key is stored as any one of: cleartext, and plaintext. Method where the workload is any one of: a virtual machine, a software container, a serverless function, and any combination thereof. Method where the workload is a secure shell (SSH) server deployed in a cloud computing environment. Method where the private CNP key is stored in any one of: a PKCS format, and an OpenSSH format. Method may include: detecting an user account identifier in the private CNP key; generating an user representation representing the user account in the security database; and connecting the user representation to the representation of the private CNP key. Method where the second workload is exposed to a network external to the cloud computing environment. Method may include: determining that the private CNP key is exposed. Implementations of the described techniques may include hardware, a method or process, or a computer tangible medium.

In one general aspect, non-transitory computer-readable medium may include one or more instructions that, when executed by one or more processors of a device, cause the device to: inspect a first workload for a private CNP key, the private CNP key associated with a hash of a public CNP key; detect in a security database a representation of the public CNP key; detect in the security database a representation of a second workload connected to the representation of a second private CNP key; and generate a lateral movement path, the lateral movement path including an identifier of the second workload, in response to detecting that the representation of the second private CNP key is connected to the representation of the public CNP key. Other embodiments of this aspect include corresponding computer systems, apparatus, and computer programs recorded on one or more computer storage devices, each configured to perform the actions of the methods.

In one general aspect, system may include a processing circuitry. System may also include a memory, the memory containing instructions that, when executed by the processing circuitry, configure the system to: inspect a first workload for a private CNP key, the private CNP key associated with a hash of a public CNP key. System may in addition detect in a security database a representation of the public CNP key. System may moreover detect in the security database a representation of a second workload connected to the representation of a second private CNP key. System may also generate a lateral movement path, the lateral movement path including an identifier of the second workload, in response to detecting that the representation of the second private CNP key is connected to the representation of the public CNP key. Other embodiments of this aspect include corresponding computer systems, apparatus, and computer programs recorded on one or more computer storage devices, each configured to perform the actions of the methods.

Implementations may include one or more of the following features. System where the memory contains further instructions which when executed by the processing circuitry further configure the system to: determine that the hash of the public CNP key associated with the private CNP key matches a public key hash represented in the security database by a public CNP key node. System where the memory contains further instructions which when executed by the processing circuitry further configure the system to: determine that the hash of the public CNP key associated with the private CNP key matches the public CNP key hash. System where the memory contains further instructions which when executed by the processing circuitry further configure the system to: connect in the security database the representation of the private CNP key to the representation of the public CNP key in response to determining that hash of the public CNP key associated with the private CNP key matches the public CNP key hash. System where the memory contains further instructions which when executed by the processing circuitry further configure the system to: detect that the private CNP key is stored as any one of: cleartext, and plaintext. System where the workload is any one of: a virtual machine, a software container, a serverless function, and any combination thereof. System where the workload is a secure shell (SSH) server deployed in a cloud computing environment. System where the private CNP key is stored in any one of: a PKCS format, and an OpenSSH format. System where the memory contains further instructions which when executed by the processing circuitry further configure the system to: detect an user account identifier in the private CNP key; generate an user representation representing the user account in the security database; and connect the user representation to the representation of the private CNP key. System where the second workload is exposed to a network external to the cloud computing environment. System where the memory contains further instructions which when executed by the processing circuitry further configure the system to: determine that the private CNP key is exposed. Implementations of the described techniques may include hardware, a method or process, or a computer tangible medium.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
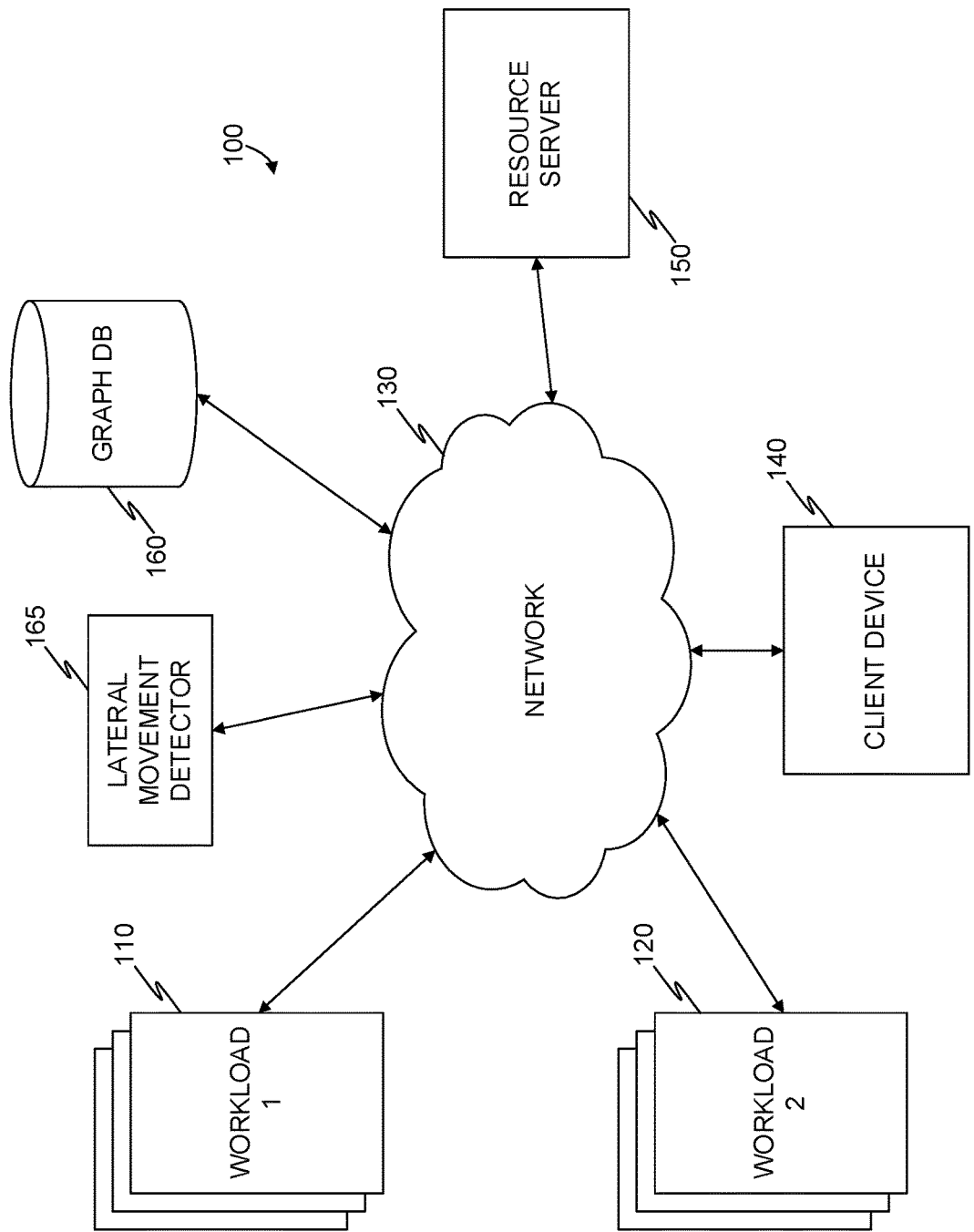
FIG. 1 is a schematic illustration of a cloud computing environment utilized to describe the various embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include a system and method for detecting lateral movement based on a compromised cryptographic network protocol (CNP) key in a cloud computing environment, which includes inspecting a workload for a private CNP key. The private CNP key further includes metadata and a public CNP key hash. The method further includes storing in a security graph: a private CNP key node representing the private CNP key, and a workload node representing the workload, wherein the security graph represents the cloud computing environment in which the workload is deployed; connecting in the security graph the private CNP key node to a public CNP key node in response to determining that the public CNP key hash of the private CNP key matches a public key hash associated with the public CNP key node; and generating a lateral movement path in response to determining that the private CNP key is compromised, the path including another workload node connected to the public CNP key.

By inspecting CNP keys and matching a private key to a public key, and representing that connection in a security graph, it is possible to generate a lateral movement path which an attacker may be able to exploit if a private key is exposed. Discovering such potential paths is useful for example to be able to put in place preventative measures or periodically inspect workloads on such paths to determine that the workloads are not compromised. Throughout this disclosure reference is made to the Secure Shell (SSH) protocol, and specifically to SSH keys, as an example. It is readily understood that the teachings herein apply to other cryptographic network protocol implementations, which are implemented using similar principals.

FIG. 1 is an example of a schematic illustration of a cloud computing environment 100 utilized to describe the various embodiments. The cloud computing environment 100 includes a network 130. In an embodiment, the network 130 may be configured to provide connectivity of various sorts, as may be necessary, including but not limited to, wired and/or wireless connectivity, including, for example, local area network (LAN), wide area network (WAN), metro area network (MAN), worldwide web (WWW), Internet, and any combination thereof, as well as cellular connectivity. The cloud computing environment 100 may be implemented for example as a virtual private cloud (VPC). In an embodiment, the cloud computing environment 100 is deployed on a cloud infrastructure. A cloud infrastructure may be, for example, Amazon® Web Services (AWS), Google® Cloud Platform (GCP), Microsoft® Azure, and the like.

The network 130 provides connectivity for multiple workload types, such as a plurality of first workloads 110, and a plurality of second workloads 120. A workload 120 may be a specific application, service, web server, container, virtual machine, serverless function, and the like. A virtual machine may be implemented, for example, as an Oracle® VirtualBox. A container may be implemented using a container engine, such as Docker® or Kubernetes®. A serverless function may be, for example, Amazon® Lambda. The network 130 may also provide connectivity for a client device 140 and a resource server 150. The client device and/or the resource server 150 may be implemented as machines which are part of the cloud-based computing environment, or as external devices to the cloud-based computing environment. In an embodiment, a client device 140 which is external to the cloud environment may request access to a service provided by a workload of the first plurality of workloads.

In some embodiments, the first plurality of workloads 110 may be workloads of a first type (e.g., virtual machines) while the second plurality of workloads 120 may be workloads of a second type (e.g., containers). An attacker may gain access to a workload of a second type from a workload of a first type, for example, by finding certificates, credentials, passwords, and the like, which can be exploited to gain access to a workload of a first type. For example, if a container is allowed to communicate with a VM, an attacker may use credentials stored in, or accessible by, the container, to attack (i.e., gain access to) the VM.

In an embodiment, workloads, client devices, and servers, may communicate using encrypted communication, for example by using an implementation of SSH protocol. A client device (i.e., SSH client) having a private encryption key performs an authentication with a server (i.e., SSH server) by generating proof of a public encryption key stored on the server. The authentication generates a unique session key which is used to encrypt further communication between the SSH client and the SSH server for the duration of a session. For example, the client device 140 may be an SSH client, and the resource server 150 may be an SSH server. In an embodiment, an SSH client includes a client software for requesting and receiving services from an SSH server.

The cloud computing environment 100 further includes a lateral movement detector 165, and a graph database 160, on which a security graph is stored. In certain embodiments, the lateral movement detector 165 and the graph database 160 are implemented in an inspecting cloud environment, which is different from the cloud computing environment 100. For example, the inspecting cloud environment may be deployed as a first VPC using a first cloud infrastructure, while the cloud computing environment 100 may be deployed as a second VPC on a second cloud infrastructure, which is different from the first cloud infrastructure.

In an embodiment, the graph database 160 may be configured to provide one or more functionalities including, without limitation, storing data received from various inspector workloads, and data layers, such as, for example, identity data, network data, image inspection data, code data, and the like. The graph database 160 creates one or more interconnected graphs representing a cloud environment, such as the cloud computing environment 100. The graph database 160 may be configured to only store environment metadata. Environment metadata may be based on workloads, user accounts, service accounts, and the like. The graph database 160 may be further configured to not store sensitive data. In certain embodiments, the security graph is generated based on a predefined data template (i.e., data schema). For example, resources may have a first data type in the data schema, while principals have another data type, which is different from the first data type. A resource may be, for example, a virtual machine, a container, a serverless function, an application, and the like. A principal is a cloud entity that acts on a resource. In an embodiment, a principal may be, for example, a user account, a service account, a role, and the like. The security graph stored in the graph database 160 is discussed in more detail below.

The lateral movement detector 165 is configured to detect lateral movement based on an exposed private key. An exposed encryption key is an encryption key which is accessible to an unauthorized user, such as an attacker, in the cloud computing environment. In an embodiment, the lateral movement detector 165 may detect encryption keys stored on a workload, stored with a user account, a service account, and the like. The lateral movement detector 165 may inspect such workloads, user accounts, service accounts, and the like, to detect SSH keys. For example, SSH keys may be stored in PKCS format (e.g., #1, #8), OpenSSH format, and the like.

In an embodiment, an inspector (not shown) deployed in the cloud environment or in an inspection cloud environment, may inspect a workload to detect therein at least one SSH key. In certain embodiments, inspecting a workload includes generating a snapshot of a disk associated with the workload, generating a volume based on the snapshot, and associating the generated volume with an inspector workload, which is configured to detect SSH keys. In certain embodiments the inspector may be implemented as a lateral movement detector.

Figure 2:
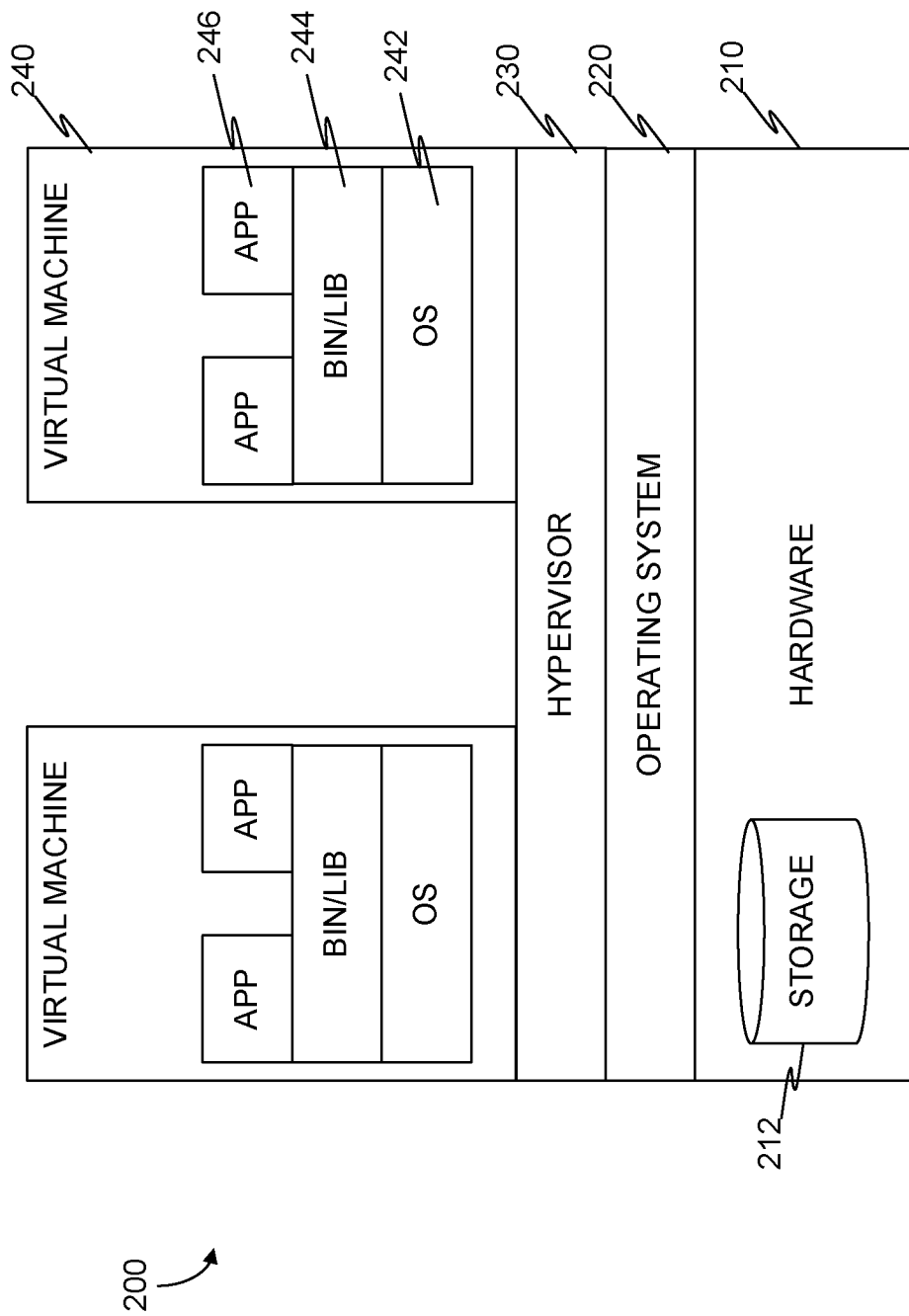
FIG. 2 is a schematic illustration for a virtual machine, utilized to describe the various embodiments.

FIG. 2 is an example of a schematic illustration for a virtual machine 200, utilized to describe the various embodiments. A virtual environment requires a hardware layer 210, which includes physical devices such as storage devices, memory devices, processors, network interface cards, and the like. Storage device 212 is an example of such a physical device.

An operating system (OS) 220 runs on top of the hardware layer 210. An OS may be, for example, Linux®, Microsoft Windows®, and the like. The OS layer supports a hypervisor application 230. A hypervisor may be, for example, Oracle® VirtualBox. The hypervisor application 230 may run a plurality of virtual machines, such as virtual machine 240. The hypervisor application 230 may provision hardware resources from the hardware layer 210.

A virtual machine 240 includes a guest OS 242, on top of which binaries and libraries 244 are loaded. Applications, such as application 246, are programmed to run in the virtual machine environment. In an embodiment, binaries are compiled applications which may be executed on the guest OS 242. In some embodiments, libraries include software resources used by applications, such as configuration data, prewritten code, predefined subroutines, classes, objects, and the like.

In an embodiment, a VM 200 may store a private SSH encryption key, for example, in a portion of the storage device 212. In certain embodiments, the private SSH encryption key may be stored as cleartext, or plaintext. Storing a key as an unencrypted text is in and of itself a security risk.

Virtual machines and containers are examples of virtual instances (i.e., workloads) which run in cloud computing environments. One benefit they provide is the ability to provision physical resources in a way which allows multiple different environments utilizing the same hardware resources. However, workloads run a risk of being exposed to the external networks, such as the Internet. This risk is inherent, for example, to being provisioned part of a cloud infrastructure, such as GCP, as a network connection is needed, by definition, to access the resources which are provisioned to any particular organization. This implies that an attacker armed with the proper knowledge, such as SSH encryption keys, can gain access to resources of a cloud environment deployed on a cloud infrastructure. It is therefore beneficial to be able to detect vulnerabilities and understand impacts of exposure as quickly as possible in order to address them.

Figure 3:
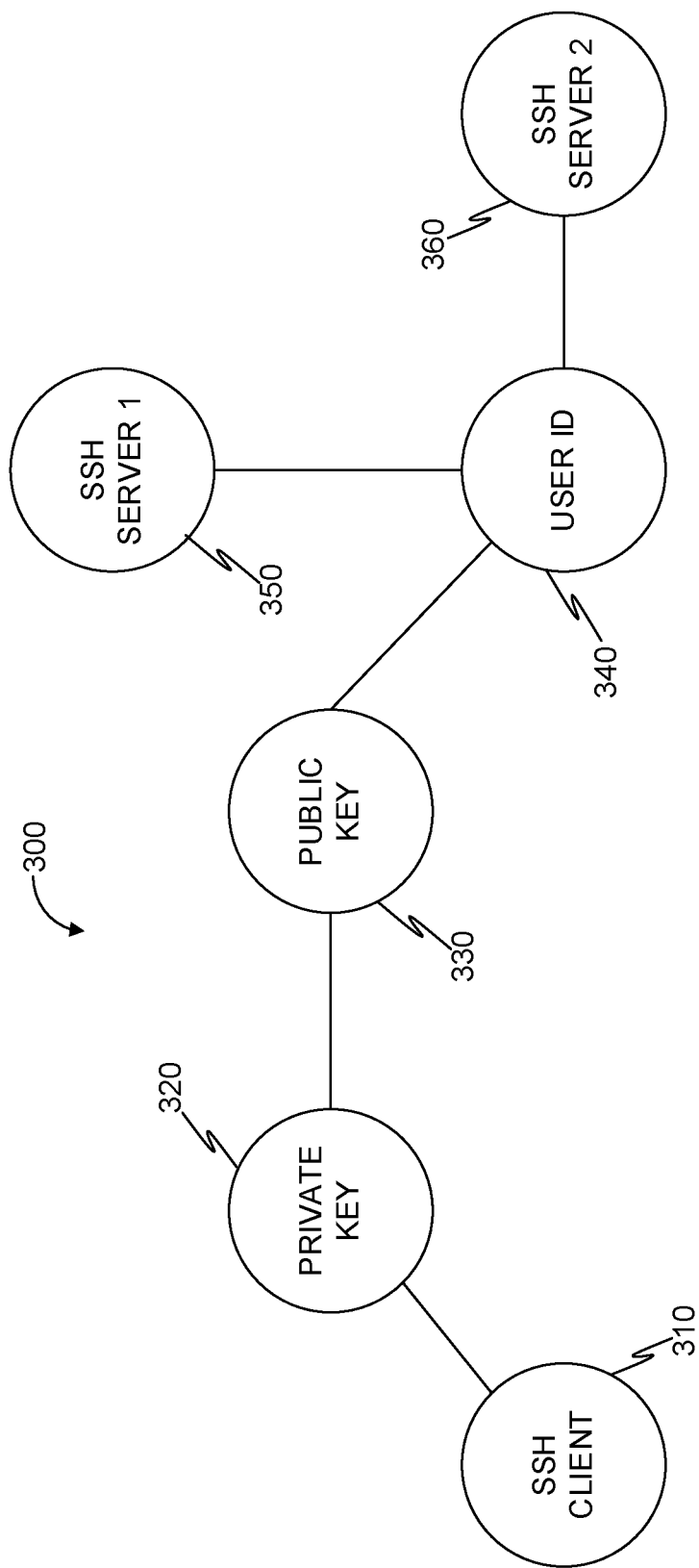
FIG. 3 is a security graph for detecting lateral movement using SSH keys in a cloud computing environment, implemented in accordance with an embodiment.

FIG. 3 is an example of a security graph 300 for detecting lateral movement using SSH keys in a cloud computing environment, implemented in accordance with an embodiment.

The security graph 300, which may be stored in a graph database, such as graph database 160 of FIG. 1, includes a plurality of nodes. In an embodiment, a cloud environment may be represented in the security graph 300. For example, resources, principals, and the like may be represented by nodes in the graph. The various nodes may be connected with edges. In certain embodiments, an edge may indicate a type of connection between two nodes. For example, an edge of a first type may indicate that a resource represented by a first node may be accessed by a principal represented by a second node. A security graph 300 may further include nodes which represent applications, enrichments, endpoints, vulnerabilities, and the like.

The security graph 300 includes an SSH client node 310, which is connected to a private key node 320. In an embodiment, the SSH client node 310 is a resource node which may represent a resource, such as a client device, an SSH client application deployed on a client device, and the like. In some embodiments, the private key node 320 is a principal node which represents a private SSH encryption key. The private key node 320 is connected to a public key node 330, representing a public SSH encryption key. The public key node is connected to a user ID node 340. The user ID node 340 represents a unique user identifier. In an embodiment, the user ID node 340 is further associated with credentials with which an SSH client (such as represented by SSH client node 310) performs authentication with a first SSH server, such as represented by a first SSH server node 350 or a second SSH server, such as represented by second SSH server node 360.

In an embodiment, the private key node 320 stores a public key hash, and the public key node 330 stores a respective public key hash. The public key hashes may be detected, for example, by an inspector, and stored in the security graph 300. The private key node 320 and public key node 330 are connected in response to determining that the public key hash stored with the private key node 320 and the public key hash stored with the public key node 330 match.

In some embodiments, the security graph 300 may further include enrichment nodes, for example, representing endpoints. In certain embodiments, the security graph 300 may include an indication for certain resource nodes which are exposed to an external network, for example, through an endpoint in the cloud computing environment.

By generating a security graph 300 including such nodes and populating it with data based on the cloud computing environment, it is possible to detect an impact of lateral movement in the cloud computing environment. For example, if a private key node 320 is indicated as compromised, the security graph 300 may be traversed to determine if there are any services (i.e., resources) which may become compromised as a result. In this example, the services which are represented by SSH server node 350 and SSH server node 360 may become compromised due to access which is possible using the private key of private key node 320.

In an embodiment, each node may further store metadata and data relating to the object. For example, a private key node 320 may include therein a hash, an SSH protocol format (e.g., PKCS, OpenSSH, etc.), encryption protocol, cleartext, plaintext, and the like.

Figure 4:
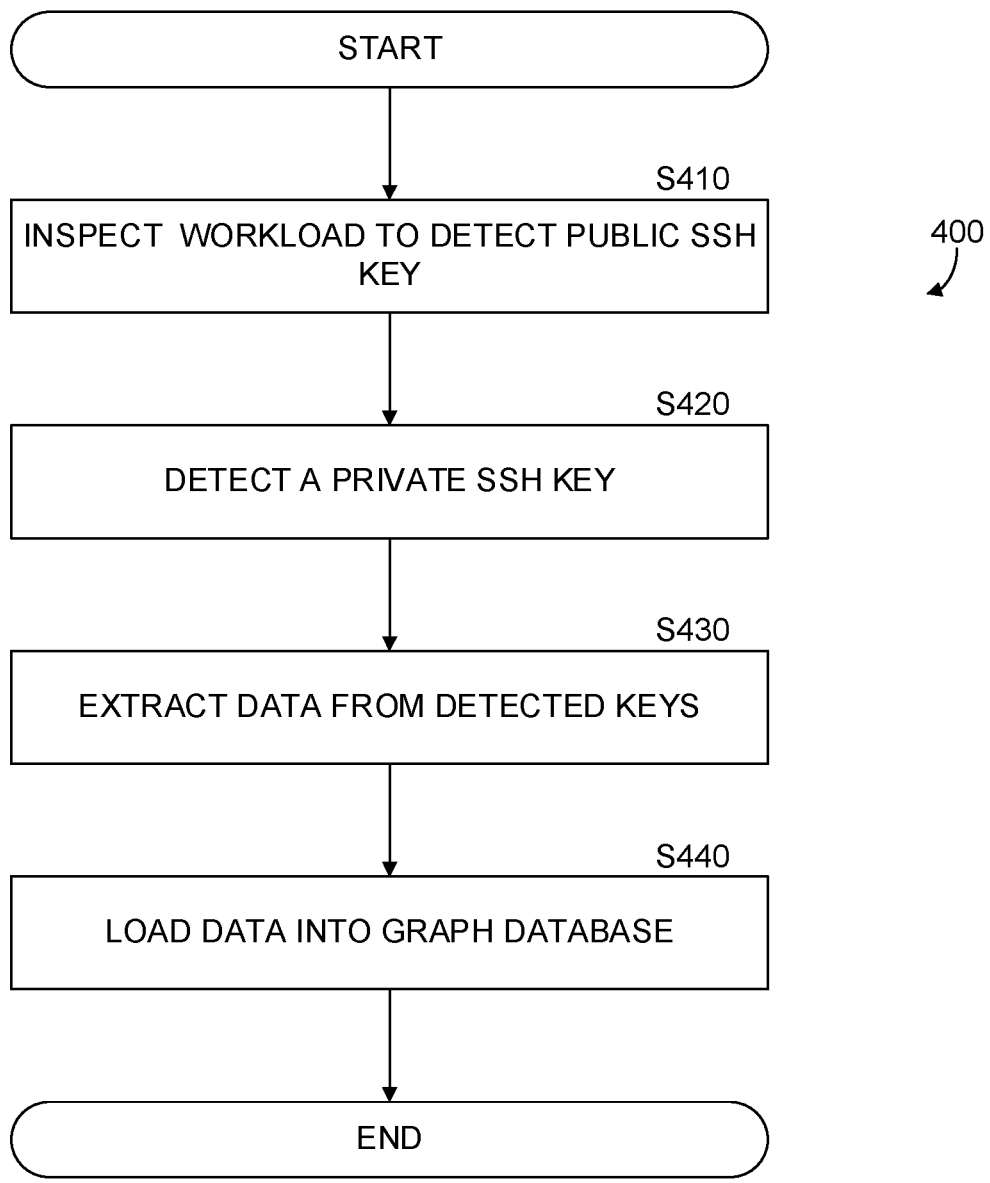
FIG. 4 is a flowchart of a method for populating a security graph, implemented in accordance with an embodiment.

FIG. 4 is an example of a flowchart 400 of a method for populating a security graph, implemented in accordance with an embodiment.

At S410, a workload is inspected to detect a public SSH key. Throughout this disclosure, reference is made to SSH keys as an example, though it can be readily understood the teachings herein equally apply to other cryptographic network protocol implementations. A key may be a public key or a private key. In an embodiment, a deep content inspection of a disk image may be implemented. Certain embodiments include inspection for multiple formats, based on different implementations (which may be defined by the SSH standard), such as PKCS (e.g. #1, #8), OpenSSH, and the like. A public SSH key includes a public key hash.

At S420, a private SSH key is detected. In an embodiment, the private key may be detected by inspecting the workload, another workload, a user account, a service account, and the like. Inspecting a user account may include, for example, reading a folder in which user account data is stored, and searching therein to match files, folders, and the like, to known file types, file names, folder names, and the like. The private SSH key includes a hash of a public key.

At S430, data is extracted from the detected keys. In an embodiment, the detected keys include at least one detected SSH public key and at least one detected private SSH key. In certain embodiments, extracted data includes metadata, such as a particular cryptography algorithm identifier, protocol identifier, version number, bit length, public key hash, and the like. A hash of the public key is used to link private SSH keys to public SSH keys which may be detected on different workloads, user accounts, service accounts, and the like.

At S440, the extracted data is loaded into a security graph. In an embodiment, the security graph may be stored in a graph database, such as graph database 160 of FIG. 1. Loading data into the security graph may include generating nodes and edges (e.g., connections). For example, a node may be generated for a detected private SSH key, and another node generated for a detected public SSH key. As the hash for the public SSH key is the same on both ends of an SSH connection, an edge is formed connecting the node representing the private SSH key and the node representing the public SSH key.

In the example of FIG. 3 above, the hash of the public SSH key is detected with the private SSH key of the SSH client and detected on the first SSH server and second SSH server. This detection allows the security graph 300 to generate an edge between the private SSH key node 320 connected to the SSH client node 310, and the public key node 330 connected to the first SSH server node 350 (for example, connected through the user ID node 340).

In an embodiment, another node may be generated to store user ID information, such as username, user account identifier, and the like. A user account identifier may be, for example, an email address. The user ID node may represent a user account, service account, and the like, which a private key allows access as.

In some embodiments, the cloud computing environment further includes a backend which may be configured to read, from cloud accounts, cloud metadata on a cloud account, including, without limitation, network configurations, IAM configurations, asset inventories, and the like, as well as any combination thereof. Such reading may be limited to control-plane configuration data, with no sensitive data accessed or transmitted. Further, the platform backend may be configured to receive metadata and security findings from an account of the client cloud (e.g., VPC), where such metadata and security findings may include, as examples and without limitation, findings such as packages and versions, misconfigurations, and the like. Data read in this manner may be further used to populate the security graph.

Figure 5:
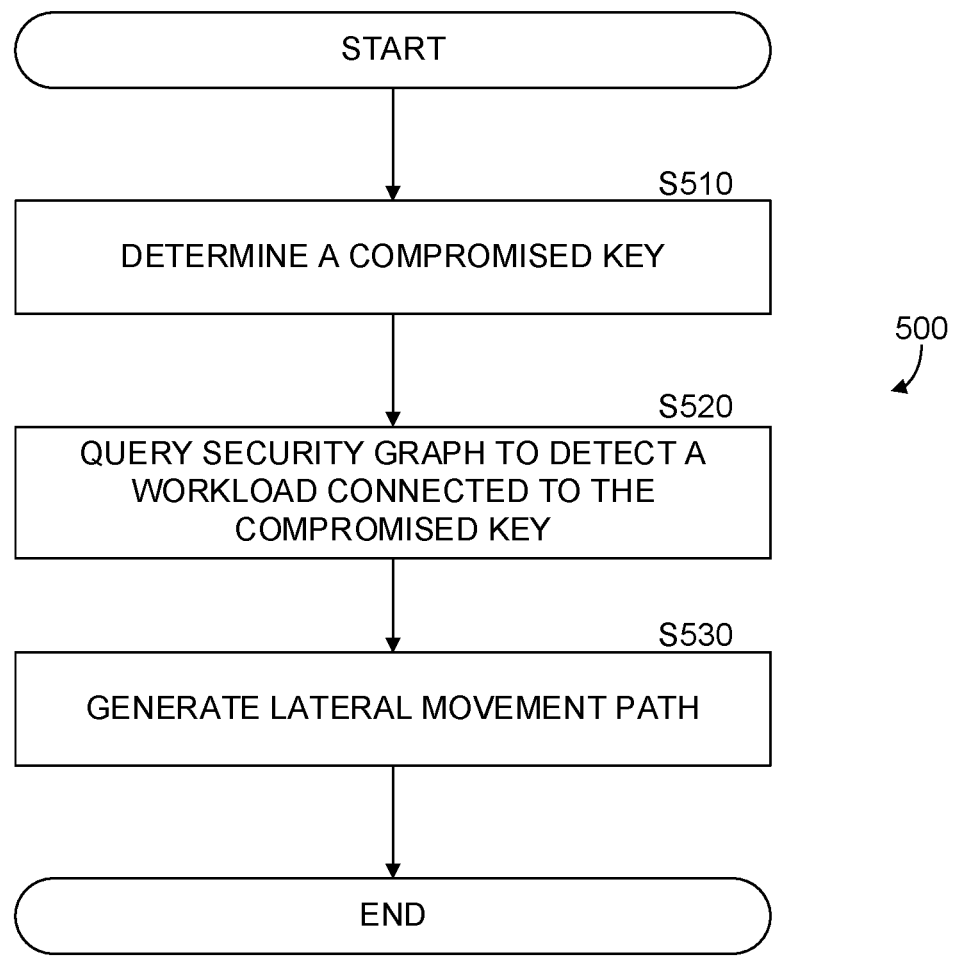
FIG. 5 is a flowchart of a method for detecting lateral movement using SSH keys with a security graph, implemented in accordance with an embodiment.

FIG. 5 is a flowchart 500 of a method for detecting lateral movement using SSH keys with a security graph, implemented in accordance with an embodiment.

At S510, a compromised key node is determined. In certain embodiments, a lateral movement detector determines that a key node is compromised. The lateral movement detector may receive an indication that an SSH key corresponding to the key node is compromised. In some embodiments, an input may be received to indicate that a certain node is compromised. In certain embodiments, a compromised node is a node to which unauthorized access has occurred or may occur. In some embodiments, a compromised node may be a simulated compromised node. For example, a simulation may be generated to determine what impact would occur in the cloud computing environment if a certain node were compromised. The compromised node is a node from the security graph, which is populated, for example, utilizing the method described above. A compromised node may be, for example, a private key node.

At S520, a security graph is queried to detect a workload connected to the compromised key. In an embodiment, querying the security graph includes a generated query to search the security graph for a node representing a workload, which is connected via an edge to the compromised key node. In an embodiment, two nodes may be connected directly by an edge, or indirectly with an intermediate node. For example, in FIG. 3 above, the private SSH key node 320 is directly connected to the public SSH key node 330, and indirectly connected to the SSH server node 350, through the public SSH key node 330 and user id node 340, which are intermediate nodes between the private SSH key node 320 and the SSH server node 350.

In some embodiments, the security graph may be queried to detect workloads which are exposed to an external network. In certain embodiments, the security graph may be further queried to detect workloads which include software, such as applications, operating systems, and the like, which are outdated (e.g., there is security patch which was not installed on the workload). In other embodiments, the security graph may be queried to detect workloads which include an SSH private key stored as a cleartext. Each such query is referred to as a control on the security graph. In some embodiments, controls may be combined, for example, to detect a workload which includes an SSH private key stored as a cleartext and is exposed to an external network.

At S530, a lateral movement path is generated. In an embodiment, the lateral movement path is generated by the lateral movement detector. In certain embodiments, a lateral movement path includes at least one resource identifier which is compromised as a result of determining that an SSH key is compromised. For example, if the private SSH key node 320 is indicated as compromised, then the first SSH server node 350 and second SSH server node 360 may be indicated as compromised and included in the lateral movement path. In some embodiments, the lateral movement path may further include detecting additional keys on a resource which is part of the lateral movement path. For example, if the second SSH server includes a private SSH key connected to a third SSH server (not shown in FIG. 3), then by compromising the second SSH server, the third SSH server may likewise be compromised.

In an embodiment, a client device, such as client device 140, or a lateral movement detector, may query the security graph to determine an impact of a compromised key node. In certain embodiments, the lateral movement detector may receive an indication that a node is compromised, then query the security graph to determine other potentially compromised nodes. Resources, such as applications, services, workloads, and the like, corresponding to potentially compromised nodes may be suspended (temporarily or permanently) from the cloud computing environment. For example, an instruction may be generated to revoke encryption keys, cloud keys, certificates, and the like, for such resources.

In some embodiments, the lateral movement detector may continuously query the security graph to determine a potentially compromised node. For example, the detector may run 'what-if' scenarios by assuming a node of the security graph is compromised, then determining what other nodes may become compromised as a result. In certain embodiments, nodes which may compromise a plurality of nodes are flagged, for example, by generating a notification identifying such nodes, or adding a metadata flag to the node itself. A threshold may be set, so that nodes which may potentially compromise a number of nodes meeting or exceeding that threshold are flagged. Identifying such nodes may allow an administrator of the cloud-based computing environment to ensure that either proper strong encryption is in place in communication of such nodes, or to alternatively design a robust network to decrease the effect of the identified node in case of compromise. For example, permissions may be split between two or more accounts for client nodes.

The ability to take such action and quickly determine compromised workloads is beneficial as it improves overall security of a system. By minimizing the amount of time an unauthorized party has access to a workload, and in general to the cloud computing environment, the potential for damage is also reduced.

Figure 6:
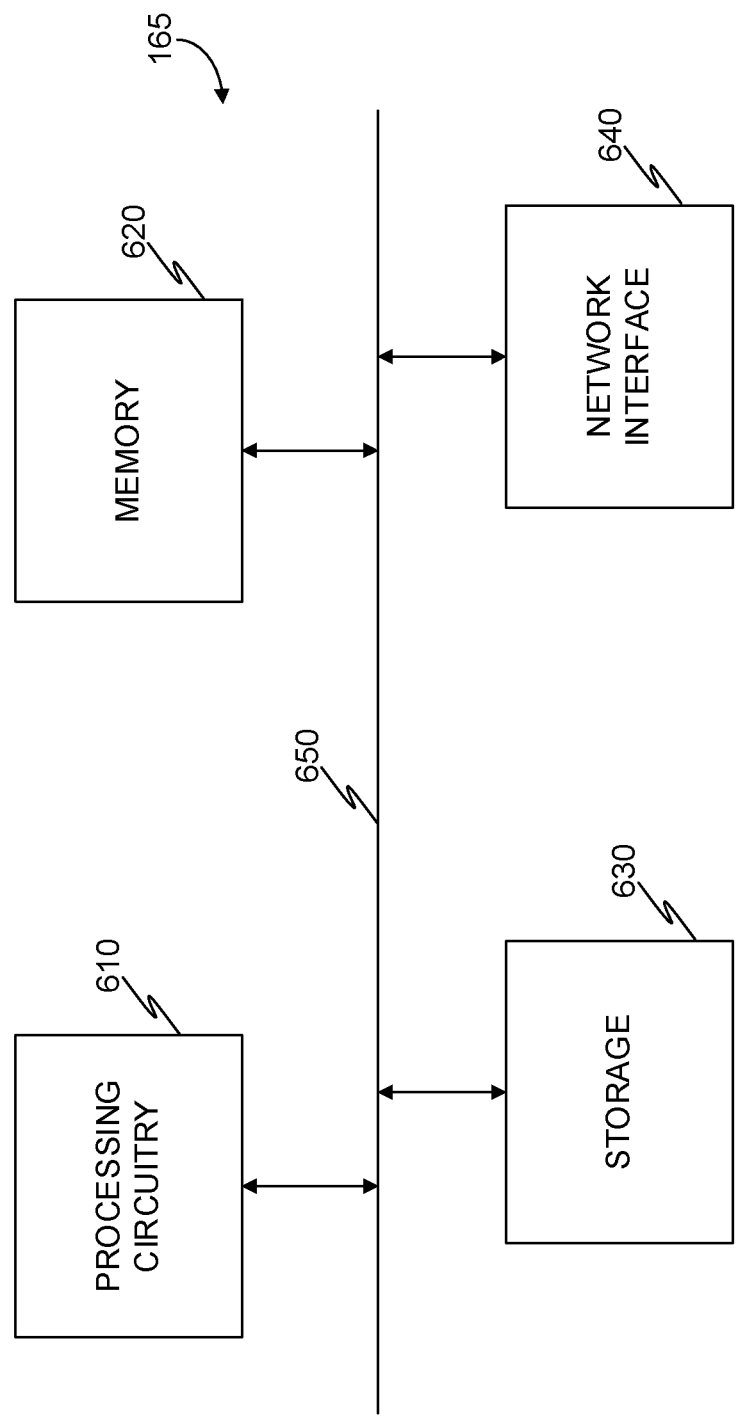
FIG. 6 is a schematic diagram of a lateral movement detector according to an embodiment.

FIG. 6 is an example schematic diagram of the lateral movement detector 165 according to an embodiment. The lateral movement detector 165 includes a processing circuitry 610 coupled to a memory 620, a storage 630, and a network interface 640. In an embodiment, the components of the lateral movement detector 165 may be communicatively connected via a bus 650.

The processing circuitry 610 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 620 may be volatile (e.g., random access memory, etc.), non-volatile (e.g., read only memory, flash memory, etc.), or a combination thereof.

In one configuration, software for implementing one or more embodiments disclosed herein may be stored in the storage 630. In another configuration, the memory 620 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 610, cause the processing circuitry 610 to perform the various processes described herein.

The storage 630 may be magnetic storage, optical storage, and the like, and may be realized, for example, as flash memory or other memory technology, or any other medium which can be used to store the desired information.

The network interface 640 allows the lateral movement detector 165 to communicate with, for example, the graph database 160.

It should be understood that the embodiments described herein are not limited to the specific architecture illustrated in FIG. 6, and other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for detecting lateral movement based on an exposed cryptographic network protocol (CNP) key in a cloud computing environment, comprising:

inspecting a first workload for a private CNP key, the private CNP key associated with a hash of a public CNP key;

detecting a user identifier associated with the private CNP key;

detecting in a security database a representation of the public CNP key;

detecting in the security database a representation of a second workload connected to the representation of a second private CNP key; and generating a lateral movement path, the lateral movement path including an identifier of the second workload, in response to detecting that the representation of the second private CNP key is connected to the representation of the public CNP key; and
generating a visual graph based on the generated lateral movement path and the detected user identifier.

2. The method of claim 1, further comprising:
generating in the security database a representation of any one of: the private CNP key, the public CNP key, the first workload, the user identifier, and a combination thereof.

3. The method of claim 1, further comprising:
storing in the representation of the private CNP key a hash of the private CNP key.

4. The method of claim 1, further comprising:
determining that the hash of the public CNP key associated with the private CNP key matches a public key hash represented in the security database by a public CNP key node.

5. The method of claim 4, further comprising:
determining that the hash of the public CNP key associated with the private CNP key matches the public CNP key hash.

6. The method of claim 5, further comprising:
connecting in the security database the representation of the private CNP key to the representation of the public CNP key in response to determining that hash of the public CNP key associated with the private CNP key matches the public CNP key hash.

7. The method of claim 1, further comprising:
detecting that the private CNP key is stored as any one of: cleartext, and plaintext.

8. The method of claim 1, wherein the workload is a secure shell (SSH) server deployed in a cloud computing environment.

9. The method of claim 1, wherein the private CNP key is stored in any one of: a PKCS format, or an OpenSSH format.

10. The method of claim 1, further comprising:
generating a user representation representing a user account associated with the user identifier in the security database; and
connecting the user representation to the representation of the private CNP key.

11. The method of claim 1, wherein the second workload is exposed to a network external to the cloud computing environment.

12. The method of claim 11, further comprising:
determining that the private CNP key is exposed, in response to detecting that the second workload is exposed to the network.

13. A non-transitory computer-readable medium storing a set of instructions for detecting lateral movement based on an exposed cryptographic network protocol (CNP) key in a cloud computing environment, the set of instructions comprising:
one or more instructions that, when executed by one or more processors of a device, cause the device to:
inspect a first workload for a private CNP key, the private CNP key associated with a hash of a public CNP key;
detect a user identifier associated with the private CNP key;
detect in a security database a representation of the public CNP key;
detect in the security database a representation of a second workload connected to the representation of a second private CNP key; and
generate a lateral movement path, the lateral movement path including an identifier of the second workload, in response to detecting that the representation of the second private CNP key is connected to the representation of the public CNP key; and
generate a visual graph based on the generated lateral movement path and the detected user identifier.

14. A system for detecting lateral movement based on an exposed cryptographic network protocol (CNP) key in a cloud computing environment comprising:
a processing circuitry;
a memory, the memory containing instructions that, when executed by the processing circuitry, configure the system to:
inspect a first workload for a private CNP key, the private CNP key associated with a hash of a public CNP key;
detect a user identifier associated with the private CNP key;
detect in a security database a representation of the public CNP key;
detect in the security database a representation of a second workload connected to the representation of a second private CNP key; and
generate a lateral movement path, the lateral movement path including an identifier of the second workload, in response to detecting that the representation of the second private CNP key is connected to the representation of the public CNP key; and
generate a visual graph based on the generated lateral movement path and the detected user identifier.

15. The system of claim 14, wherein the memory contains further instructions which when executed by the processing circuitry further configure the system to:
generate in the security database a representation of any one of:
the private CNP key, the public CNP key, the first workload, the user identifier, and a combination thereof.

16. The system of claim 14, wherein the memory contains further instructions which when executed by the processing circuitry further configure the system to:
store in the representation of the private CNP key a hash of the private CNP key.

17. The system of claim 14, wherein the memory contains further instructions which when executed by the processing circuitry further configure the system to:
determine that the hash of the public CNP key associated with the private CNP key matches a public key hash represented in the security database by a public CNP key node.

18. The system of claim 17, wherein the memory contains further instructions which when executed by the processing circuitry further configure the system to:
determine that the hash of the public CNP key associated with the private CNP key matches the public CNP key hash.

19. The system of claim 18, wherein the memory contains further instructions which when executed by the processing circuitry further configure the system to:
connect in the security database the representation of the private CNP key to the representation of the public CNP key in response to determining that hash of the public CNP key associated with the private CNP key matches the public CNP key hash.

20. The system of claim 14, wherein the memory contains further instructions which when executed by the processing circuitry further configure the system to:
detect that the private CNP key is stored as any one of: cleartext, and plaintext.

21. The system of claim 14, wherein the workload is a secure shell (SSH) server deployed in a cloud computing environment.

22. The system of claim 14, wherein the private CNP key is stored in any one of:
 a PKCS format, or an OpenSSH format.

23. The system of claim 14, wherein the memory contains further instructions which when executed by the processing circuitry further configure the system to:
 generate a user representation representing a user account associated with the user identifier in the security database; and
 connect the user representation to the representation of the private CNP key.

24. The system of claim 14, wherein the second workload is exposed to a network external to the cloud computing environment.

25. The system of claim 24, wherein the memory contains further instructions which when executed by the processing circuitry further configure the system to:
 determine that the private CNP key is exposed, in response to detecting that the second workload is exposed to the network.

* * * * *